(12) United States Patent
Melanson et al.

(10) Patent No.: US 9,282,598 B2
(45) Date of Patent: Mar. 8, 2016

(54) SYSTEM AND METHOD FOR LEARNING DIMMER CHARACTERISTICS

(71) Applicant: KONINKLIJKE PHILIPS N.V., Eindhoven (NL)

(72) Inventors: John L. Melanson, Austin, TX (US); Eric King, Dripping Springs, TX (US); Siddharth Maru, Austin, TX (US)

(73) Assignee: KONINKLIJKE PHILIPS N.V. (NL)

( * ) Notice: Subject to any disclaimer, the term of this patent is extended or adjusted under 35 U.S.C. 154(b) by 228 days.

(21) Appl. No.: 14/101,963

(22) Filed: Dec. 10, 2013

(65) Prior Publication Data

US 2014/0265933 A1 Sep. 18, 2014

Related U.S. Application Data

(60) Provisional application No. 61/798,493, filed on Mar. 15, 2013.

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ........ *H05B 33/0806* (2013.01); *H05B 33/0845* (2013.01); *H05B 33/0848* (2013.01); *H05B 39/044* (2013.01); *Y02B 20/383* (2013.01)

(58) Field of Classification Search
USPC .......................................... 315/307, 297, 302
See application file for complete search history.

(56) References Cited

U.S. PATENT DOCUMENTS

| | | | |
|---|---|---|---|
| 4,523,128 A | 6/1985 | Stamm et al. |
| 5,055,746 A | 10/1991 | Hu et al. |
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |

(Continued)

FOREIGN PATENT DOCUMENTS

| | | |
|---|---|---|
| EP | 1164819 | 12/2001 |
| EP | 2257124 A1 | 1/2010 |

(Continued)

OTHER PUBLICATIONS

Patterson, James. "Efficient Method for Interfacing Triac Dimmers and LEDs", EDN Network, Jun. 23, 2011, 4 pages (pp. 1-4 in pdf), National Semiductor Corp., UBM Tech.

(Continued)

*Primary Examiner* — Adam Houston

(57) ABSTRACT

Systems and methods for learning dimmer characteristics provide improved efficiency in operating lighting devices. In one embodiment, an apparatus includes a lamp controller that is configured to monitor voltage information associated with one or more lamps or a dimmer of a system, adjust one or more parameters of an attach current profile in conformity with the voltage information to arrive at a selected attach current profile, and apply within the system the selected attach current profile.

26 Claims, 8 Drawing Sheets

(56) References Cited

U.S. PATENT DOCUMENTS

| | | | |
|---|---|---|---|
| 6,091,205 A | 7/2000 | Newman, Jr. et al. | |
| 6,211,624 B1 | 4/2001 | Holzer | |
| 6,380,692 B1 | 4/2002 | Newman, Jr. et al. | |
| 6,407,514 B1 | 6/2002 | Glaser et al. | |
| 6,510,995 B2 | 1/2003 | Muthu et al. | |
| 6,621,256 B2 | 9/2003 | Muratov et al. | |
| 6,713,974 B2 | 3/2004 | Patchornik et al. | |
| 6,858,995 B2 | 2/2005 | Lee et al. | |
| 6,900,599 B2 | 5/2005 | Ribarich | |
| 7,102,902 B1 | 9/2006 | Brown et al. | |
| 7,180,250 B1 | 2/2007 | Gannon | |
| 7,184,937 B1 | 2/2007 | Su et al. | |
| 7,288,902 B1 | 10/2007 | Melanson | |
| 7,656,103 B2 | 2/2010 | Shteynberg et al. | |
| 7,719,246 B2 | 5/2010 | Melanson | |
| 7,728,530 B2 | 6/2010 | Wang et al. | |
| 7,733,678 B2 | 6/2010 | Notohamiprodjo et al. | |
| 7,759,881 B1 | 7/2010 | Melanson | |
| 7,786,711 B2 | 8/2010 | Wei et al. | |
| 7,872,427 B2 | 1/2011 | Scianna | |
| 8,102,167 B2 | 1/2012 | Irissou et al. | |
| 8,115,419 B2 | 2/2012 | Given et al. | |
| 8,169,154 B2 | 5/2012 | Thompson et al. | |
| 8,212,491 B2 | 7/2012 | Kost et al. | |
| 8,212,492 B2 | 7/2012 | Lam et al. | |
| 8,222,832 B2 | 7/2012 | Zheng et al. | |
| 8,487,546 B2 | 7/2013 | Melanson | |
| 8,508,147 B2 | 8/2013 | Shen | |
| 8,536,794 B2 | 9/2013 | Melanson et al. | |
| 8,536,799 B1 | 9/2013 | Grisamore et al. | |
| 8,547,034 B2 | 10/2013 | Melanson et al. | |
| 8,569,972 B2 | 10/2013 | Melanson | |
| 8,610,364 B2 | 12/2013 | Melanson et al. | |
| 8,610,365 B2 | 12/2013 | King et al. | |
| 8,664,885 B2 | 3/2014 | Koolen et al. | |
| 8,716,957 B2 | 5/2014 | Melanson et al. | |
| 8,749,173 B1 | 6/2014 | Melanson et al. | |
| 8,847,515 B2 | 9/2014 | King et al. | |
| 9,131,581 B1* | 9/2015 | Hsia | H05B 33/086 |
| 2002/0140371 A1 | 10/2002 | Chou et al. | |
| 2004/0105283 A1 | 6/2004 | Schie et al. | |
| 2004/0212321 A1 | 10/2004 | Lys et al. | |
| 2006/0022648 A1 | 2/2006 | Ben-Yaakov et al. | |
| 2006/0208669 A1 | 9/2006 | Huynh et al. | |
| 2007/0182338 A1 | 8/2007 | Shteynberg et al. | |
| 2007/0182347 A1 | 8/2007 | Shteynberg | |
| 2008/0018261 A1 | 1/2008 | Kastner | |
| 2008/0101098 A1 | 5/2008 | Disney | |
| 2008/0143266 A1 | 6/2008 | Langer | |
| 2008/0192509 A1 | 8/2008 | Dhuyvetter et al. | |
| 2008/0205103 A1 | 8/2008 | Sutardja et al. | |
| 2008/0224629 A1 | 9/2008 | Melanson | |
| 2008/0224633 A1 | 9/2008 | Melanson | |
| 2008/0224636 A1 | 9/2008 | Melanson | |
| 2009/0134817 A1 | 5/2009 | Jurngwirth et al. | |
| 2009/0135632 A1 | 5/2009 | Sohma | |
| 2009/0195186 A1 | 8/2009 | Guest et al. | |
| 2009/0284182 A1 | 11/2009 | Cencur | |
| 2010/0002480 A1 | 1/2010 | Huynh et al. | |
| 2010/0013405 A1 | 1/2010 | Thompson et al. | |
| 2010/0013409 A1 | 1/2010 | Quek et al. | |
| 2010/0066328 A1 | 3/2010 | Shimizu et al. | |
| 2010/0164406 A1 | 7/2010 | Kost et al. | |
| 2010/0213859 A1 | 8/2010 | Shteynberg et al. | |
| 2010/0231136 A1 | 9/2010 | Reisenauer et al. | |
| 2010/0244726 A1 | 9/2010 | Melanson | |
| 2011/0012530 A1* | 1/2011 | Zheng | H05B 33/0815 315/294 |
| 2011/0043133 A1 | 2/2011 | Van Laanen et al. | |
| 2011/0080110 A1 | 4/2011 | Nuhfer et al. | |
| 2011/0084622 A1 | 4/2011 | Barrow et al. | |
| 2011/0084623 A1 | 4/2011 | Barrow | |
| 2011/0115395 A1 | 5/2011 | Barrow et al. | |
| 2011/0121744 A1* | 5/2011 | Salvestrini | H05B 33/0815 315/246 |
| 2011/0121754 A1 | 5/2011 | Shteynberg | |
| 2011/0148318 A1 | 6/2011 | Shackle et al. | |
| 2011/0204797 A1 | 8/2011 | Lin et al. | |
| 2011/0204803 A1 | 8/2011 | Grotkowski et al. | |
| 2011/0234115 A1 | 9/2011 | Shimizu et al. | |
| 2011/0266968 A1 | 11/2011 | Bordin et al. | |
| 2011/0266969 A1* | 11/2011 | Ludorf | H02M 1/4258 315/294 |
| 2011/0291583 A1 | 12/2011 | Shen | |
| 2011/0309759 A1 | 12/2011 | Shteynberg et al. | |
| 2012/0049752 A1 | 3/2012 | King et al. | |
| 2012/0056548 A1* | 3/2012 | Duan | H05B 33/0815 315/200 R |
| 2012/0068626 A1 | 3/2012 | Lekatsas et al. | |
| 2012/0098454 A1 | 4/2012 | Grotkowski et al. | |
| 2012/0098457 A1* | 4/2012 | Radermacher | H05B 33/0815 315/291 |
| 2012/0112651 A1 | 5/2012 | King et al. | |
| 2012/0133291 A1 | 5/2012 | Kitagawa et al. | |
| 2012/0286686 A1 | 11/2012 | Watanabe et al. | |
| 2013/0002156 A1 | 1/2013 | Melanson et al. | |
| 2013/0154495 A1 | 6/2013 | He | |
| 2013/0154515 A1* | 6/2013 | Brandt | H05B 37/02 315/307 |
| 2014/0009082 A1* | 1/2014 | King | H05B 37/02 315/247 |
| 2014/0197760 A1* | 7/2014 | Radermacher | H05B 33/0815 315/307 |
| 2014/0203721 A1* | 7/2014 | Qiao | H05B 33/0887 315/201 |
| 2014/0239840 A1* | 8/2014 | Wang | H05B 33/0854 315/224 |
| 2014/0265933 A1* | 9/2014 | Melanson | H05B 33/0806 315/307 |
| 2014/0300289 A1* | 10/2014 | Zhu | H05B 33/0815 315/206 |
| 2014/0339999 A1* | 11/2014 | Melanson | H02M 3/07 315/294 |
| 2015/0084529 A1* | 3/2015 | Otake | H02M 7/06 315/200 R |
| 2015/0237695 A1* | 8/2015 | Jelaca | H05B 33/0815 315/291 |
| 2015/0256091 A1* | 9/2015 | Melanson | H02M 5/293 315/200 R |
| 2015/0303796 A1* | 10/2015 | Mazumdar | H02M 3/156 323/282 |
| 2015/0303812 A1* | 10/2015 | Mao | H02M 3/33515 363/21.13 |
| 2015/0312988 A1* | 10/2015 | Liao | H05B 33/0815 315/119 |

FOREIGN PATENT DOCUMENTS

| | | |
|---|---|---|
| EP | 2232949 | 9/2010 |
| JP | 2008053181 A | 3/2008 |
| JP | 2009170240 A | 7/2009 |
| WO | WO 9917591 | 4/1999 |
| WO | WO 02/096162 A1 | 11/2002 |
| WO | WO 2006/079937 A1 | 8/2006 |
| WO | 2008029108 | 3/2008 |
| WO | WO 2008112822 A2 | 9/2008 |
| WO | 2010011971 A1 | 1/2010 |
| WO | WO 2010027493 A2 | 3/2010 |
| WO | WO 2010035155 A2 | 4/2010 |
| WO | WO 2011008635 A2 | 1/2011 |
| WO | WO 2011/050453 A1 | 5/2011 |
| WO | WO 2011/056068 A2 | 5/2011 |
| WO | WO 2012/016197 A1 | 2/2012 |

OTHER PUBLICATIONS

Vainio, et al., "Digital Filtering for Robust 50/60 Hz Zero-Crossing Detectors", IEEE Transactions on Instrumentation and Measurement, Apr. 1996, vol. 45, No. 2, Piscataway, NJ, US.

Supertex, Inc., HV9931 Unity Power Factor LED Lamp Driver, pp. 1-7, Aug. 2005, Sunnyvale, CA, USA.

Azoteq, IQS17 Family, IQ Switch—ProxSense Series, Touch Sensor, Load Control and User Interface, IQS17 Datasheet V2.00.doc, Jan.

(56) References Cited

OTHER PUBLICATIONS 2007, pp. 1-51, Azoteq (Pty) Ltd., Paarl, Western Cape, Republic of South Africa.
Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.
Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.
Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.
Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.
Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.
Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.
Engdahl, Tomi, Light Dimmer Circuits, 1997-2000, 9 pages (pp. 1-9 in pdf), dowloaded from www.epanorama.net.
O'Rourke, Conan, et al, Dimming Electronic Ballasts, National Lighting Product Information Program, Specifier Reports, vol. 7, No. 3, Oct. 1999, pp. 1-24, Troy, NY, USA.
Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.
Why Different Dimming Ranges?, 2003, 1 page, downloaded from http://www.lutron.com/TechnicalDocumentLibrary/LutronBallastpg3.pdf.
Wu, Tsai-Fu, et al, Single-Stage Electronic Ballast with Dimming Feature and Unity Power Factor, IEEE Transactions on Power Electronics, vol. 13, No. 3, May 1998, pp. 586-597.
U.S. Appl. No. 14/212,546, filed Mar. 14, 2014, Melanson, et al.
Adrian Z Amanci, et al. "Synchronization System with Zero-Crossing Peak Detection Algorithm for Power System Applications." 2010 IPEC Conference. Jun. 2010. pp. 2884-2991. Publisher: IEEE. Piscataway, NJ, USA.

\* cited by examiner

SYSTEM AND METHOD FOR LEARNING DIMMER CHARACTERISTICS

This Patent Application claims priority under 35 U.S.C. 119(e) to U.S. Provisional Patent Application Ser. No. 61/798,493 filed on Mar. 15, 2013

BACKGROUND OF THE INVENTION

1. Field of the Invention

This disclosure relates generally to lighting, lighting circuits, and lighting controllers. More particularly, the disclosure concerns systems and methods for learning dimmer characteristics, particularly for operating LED lamps, although the disclosure is not so-limited.

2. Description of Related Art

Lighting control circuits that are operated from thyristor-based dimmers are designed to provide proper operation of the dimmers, as well as the alternative lighting devices, i.e. light-emitting diodes.

It is desirable to provide improvements in efficiency, compatibility and other characteristics of lighting control circuits designed for operation from a dimmer as disclosed in further detail below.

SUMMARY OF THE INVENTION

Circuits and methods that learn characteristics of dimmers monitor voltage information associated with one or more lamps or a dimmer of a system, adjust one or more parameters of an attach current profile in conformity with the voltage information to arrive at a selected attach current profile, and apply the selected attach current profile within the system.

Several representative embodiments of the present disclosure are described below and in the appended claims. For example, the elements of the claims summarize components and/or method steps for various embodiments. Note that different embodiments may utilize those components or method steps in any combination, order, or the like. For example, any component or method step in a dependent claim may be utilized in a suitable independent claim. Components or steps described in a combination may be used individually, and those described individually may be used in any combination.

DESCRIPTION OF ILLUSTRATIVE EMBODIMENT

Figure 1:
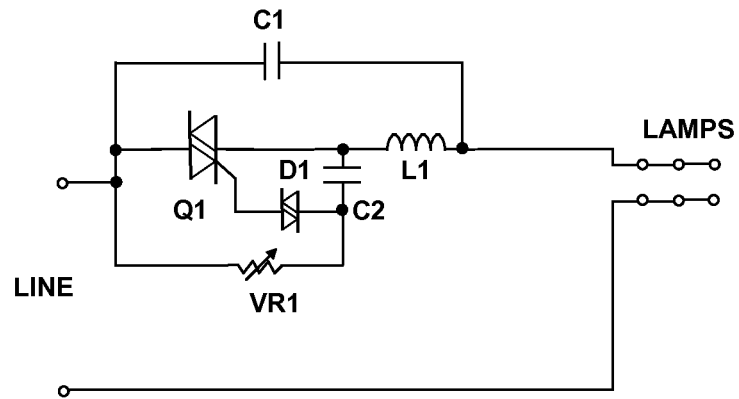
FIG. 1 is a diagram of lighting devices connected to a triac-based dimmer circuit.

While existing dimmer compatibility techniques may be effective at providing a load that allows proper operation of many types of dimmers, room for improvement remains. For example, a need exists to better address differences between dimmers that may require, e.g., 50 mA holding current, while another may require, e.g., only 25 mA holding current. The holding current for a triac is defined as the current that must be conducted through the dimmer to maintain the triac within the dimmer in the on-state, once the triac is activated, and is generally determined by resistive losses in the triac. A lamp should draw sufficient current to keep the triac in conduction for a period of time, and the holding current may be conducted through one lamp, or through multiple lamps in parallel. The efficiency of a lighting system should similarly be optimized for a given configuration of dimmer and lamps. U.S. Patent Application Publication No. US20120049752 and having a priory date of Aug. 24, 2010, is incorporated herein by reference in its entirety and shows circuits for providing power to LED lighting circuits from an AC power line.

In the arrangement described above, if a required holding current is 50 mA, and it is known a priori that there will always be at least two lamps on a dimmer output, each lamp is only required to maintain a 25 mA (or less) current draw, which allows the lamps to be lower in cost and higher in efficiency. However, designing such a lamp sacrifices the ability to operate properly in a single lamp circuit.

In one embodiment, to achieve high efficiency and a larger range of compatibility, a lamp may be configured to adaptively learn, for example, a required hold current. The hold current drawn by the lamp may be reduced until the dimmer disconnects, and then increased to a "just adequate" level (e.g., at or slightly above a level that ensures attachment, satisfactory operation, and/or compatibility with that dimmer). This adjustment may be done automatically and may compensate for, e.g., dimmer hold current and lamp multiplicity.

In some embodiments, the current drawn by the lamp can be reduced until the required current is drawn across an entire available part of a line cycle. This approach may minimize ripple current, decreasing flicker, and increasing the system power factor.

In some embodiments, one or more parameters of a more generalized attach current profile may be adjusted (e.g., in an iterative manner) within a lighting environment or lighting system, so that a hold current, or other parameter, associated with one or more lamps may be selected and applied. In a representative embodiment, an attach current profile may generally involve timing, amplitude, slope, or other parameters of a current waveform. An attach current profile may be associated with a leading edge of a dimmer. Representative, non-limiting parameters associated with the attach current profile may include information concerning: starting current, steady state hold current, timing (e.g., time duration between start of current and steady state hold current, each relative to a leading edge of a dimmer), etc. The additional parameters included in the profile are desirable because many dimmers require a current during the first several hundred microseconds after the leading edge (the time of triac start of conduction) that is greater than a current required later in the cycle. Additionally, positive and negative half line cycles may cause different behaviors in the triac, and different attach current profiles may be required for the positive and negative half line cycles.

In operation, once adjustment (e.g., iterative adjustment) of one or more parameters of an attach current profile leads to the selection of a suitable attach current profile (e.g., a current profile in which a hold current or other parameter may be adjusted to a "just adequate" level), the selected suitable profile can be applied to power one or more lamps. The selected attach current profile may take into account a number of factors, such as, but not limited to, whether parallel lamps are connected within the system.

In one embodiment, a given lamp may sense the presence of other lamps in an environment or system by monitoring the behavior of, e.g., an input voltage after sufficient power is drawn from a line. If another lamp utilizes probe cycles to determine the location of a zero crossing, that effect can be observed by monitoring the line voltage. If an incandescent lamp, or similar load, is present, the input voltage will consistently track the input sine wave after attach, and nearly to the zero crossing without aid of a probe cycle. If a dimmer is a FET-type dimmer, there is no required minimum hold current, and only a glue current is required. This again may increase power factor and efficiency.

In some embodiments, more generally, voltage information may be used to determine whether, for example, parallel lamps are connected to a dimmer, and that information may in turn be used to adjust (e.g., iteratively) one or more parameters of an attach current profile until a suitable profile is selected and applied to the appropriate one or more lamps within the environment or system.

Typically, when a lamp is turned on, a system configuration will be identical or substantially identical to the prior operating state. The prior operating state can be remembered, and the proper operation immediately entered.

A typical dimmer circuit model is shown in FIG. 1. Inductor L1 and capacitor C1 reduce high-frequency emissions and allow for quieter operation. Inductor L1 and capacitor C1 also store energy, requiring the energy to be damped by the load to avoid disconnecting triac TR1 on initiation of a leading edge.

Figure 2:
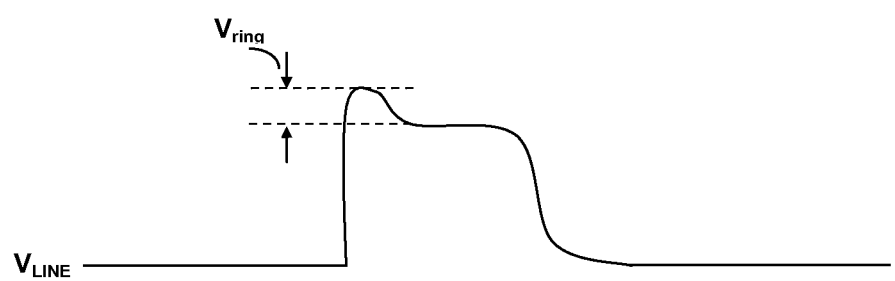
FIG. 2 is a pictorial diagram depicting a voltage waveform in the circuit of FIG. 1.

FIG. 2 shows ringing $V_{ring}$ on the input voltage $V_{LINE}$ at the dimmer. Significant current must be drawn by the lamp in order to damp the ringing if the values of inductor L1 and capacitor C1 are large. In other dimmers, there is little or no filtering. The ringing effect can be characterized for each lamp, and only sufficient current is drawn to damp the actual LC circuit formed by inductor L1 and capacitor C1. The damping also requires less current if there are multiple lamps in parallel.

One or more of the parallel lamps may be constructed with a different style of dimmer compatibility circuit. In some installations, probe operation by one lamp may disrupt the operation of a lamp not designed for probing operation.

Figure 3A:
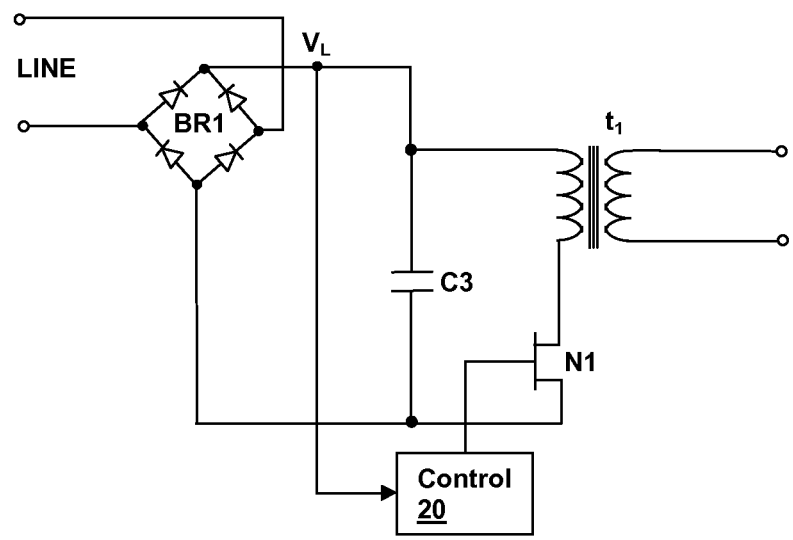
FIG. 3A is a simplified schematic diagram of an example lighting control circuit.
Figure 3B:
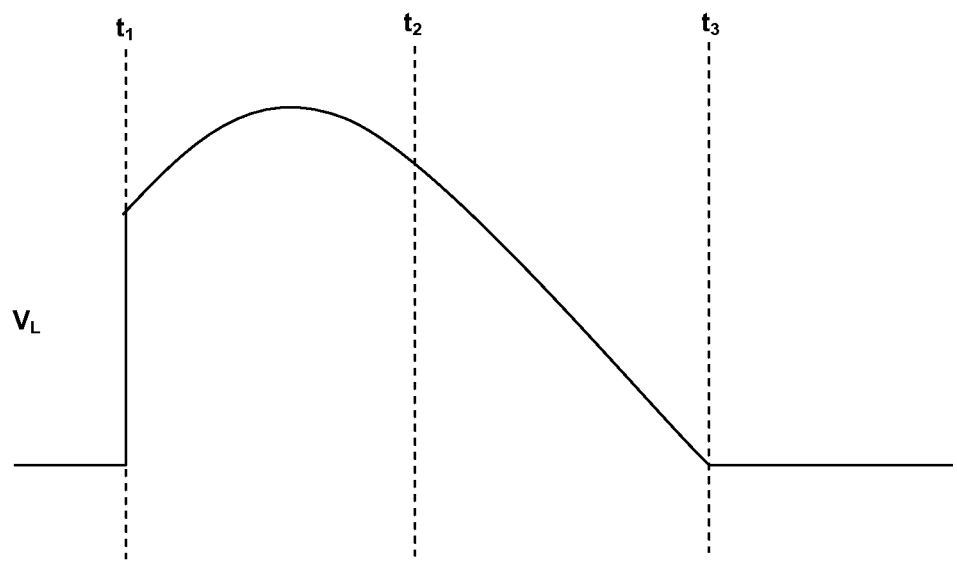
FIG. 3B is a pictorial diagram of a voltage waveform in the example lighting control circuit of FIG. 3A.

In one embodiment, disruption to a line voltage source may be minimized by synthesizing the line voltage at the mains, and causing the same voltage to be replicated at the input to the lamp. The synthesizing maintains the voltage impressed across dimmer at a zero value until the next zero crossing of the line voltage, which may maximize dimmer compatibility, especially when a large number of lamps are interconnected. FIG. 3A illustrates a switching power supply circuit including an input bridge rectifier BR1 connected to input line voltage LINE, a capacitor C3, a switching transistor N1, a transformer T1 and a control circuit 20 that performs the above-described operation, which is also illustrated by FIG. 3B, which from time $t_1$ until time $t_2$ shows the current drawn through input bridge rectifier BR1 and from time $t_2$ until time $t_3$ shows the current drawn to emulate a sinusoidal waveform.

It is desirable to carry as much information as possible from one operation of a lamp to the next operation. For example, if a lamp is activated every evening, and turned off in the morning, preferably information is retained in the lamp, which can be accomplished in multiple ways.

In one embodiment, a lamp may contain non-volatile memory. The memory can be programmed on power-down.

A lamp, if on a smart dimmer that requires current in the off phase, may use a small amount of that current to maintain a random access memory (RAM) memory, or other type of memory, with the information.

In one embodiment, a lamp may be programmed for a configuration. For example, information may be carried on a power line to allow a lamp to be provided information related to a configuration. For example, four (4) rapid on/off cycles (or another indicator) may be used to signal a lamp that it will always be in a multi-lamp configuration. That configuration information may be stored in internal memory. Other power line communications protocols may be used, e.g. X10. Optical or radio communications may also be used.

In other embodiments, a dimming curve may be altered using dimmer and/or configuration information.

Some dimmers require a lamp to dissipate significantly more power than others. High holding current and large filter components are exemplary causes. In these lamps, the total light output may be reduced to simplify thermal management, while allowing full output in other cases. The shape of the dimming curve may also change; an example would be increasing the light output at a time corresponding to 90 degrees of phase-cut. Similarly, multiple parallel lamps, when the lamp determines that there is less dissipation required, may operate at a greater brightness.

Figure 4:
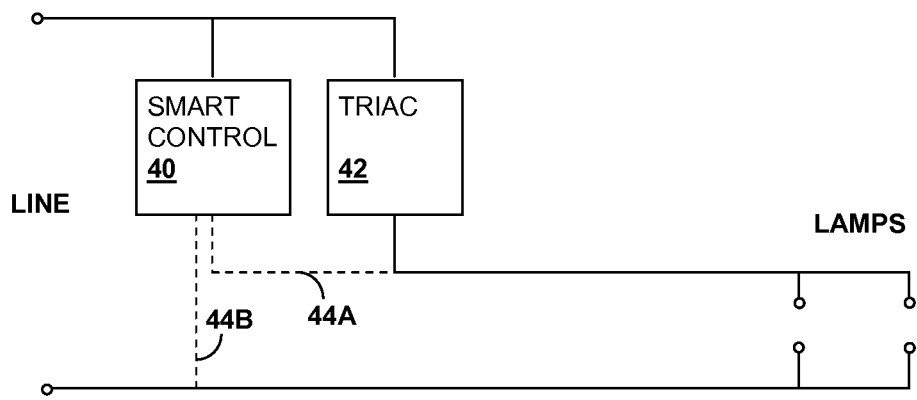
FIG. 4 is a block diagram illustrating features of an example lighting control circuit.

Other embodiments involve two (2)-wire versus three (3)-wire dimmers. Many smart dimmers (those including a power supply for a micro-controller) may be wired as either 3-wire or 2-wire. FIG. 4 illustrates a circuit arrangement in which a smart control 40 returns current through circuit path 44B to the input voltage source. In the 3-wire configuration, the dimmer smart current is returned through the direct neutral line. In the 2-wire configuration, all current is returned to neutral through the lamp as shown by circuit path 44A. In general, the 3-wire configuration is more stable, and does not require glue current (current during the "dimmer off" part of the phase). This configuration may be determined by the lamp, and a 3-wire configuration may often result in higher lamp efficiency.

Figure 5A:
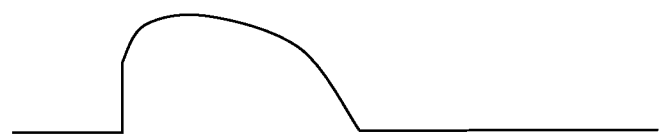
FIGS. 5A-5E are waveform diagrams showing voltages and currents within the circuit of FIG. 4.
Figure 5B:
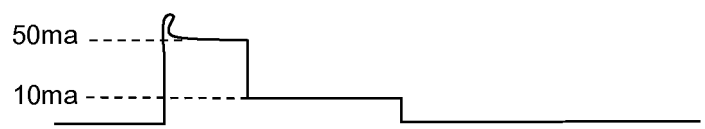
Figure 5C:
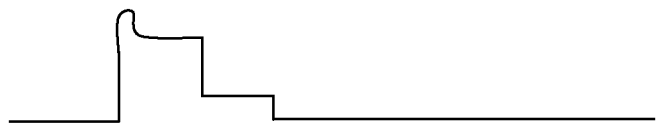
Figure 5D:
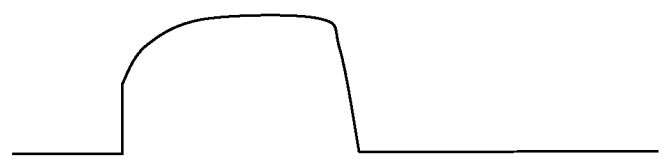
Figure 5E:
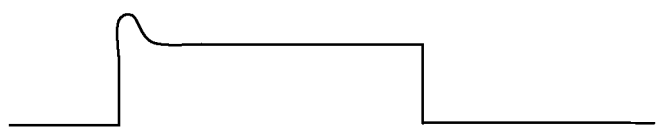

Other embodiments involve techniques for detecting system configuration. If the voltage at a lamp has a waveform as shown in FIG. 5A, when the current profile of the lamp appears as shown in FIG. 5B, the hold current may be safely reduced. An example acceptable current is shown in FIG. 5E. If instead, when trying to draw current as shown by FIG. 5B, the waveform collapses, as shown in FIG. 5C, or the current cannot be reduced to the desired level (in the given example, 10 mA) as shown in FIG. 5D.

The reduction of current may be made in slow steps, e.g., from 50 ma, 45 ma, 40 ma, etc., until a minimum acceptable level is determined.

Other embodiments involve optimization of an attach or hold current. In a similar way to that described above, an attach current (e.g., a current drawn by a lamp to damp an LC dimmer circuit) may be reduced to minimize dissipation. This may be accomplished by measuring an undershoot of the ringing and adjusting appropriately.

Figure 6A:
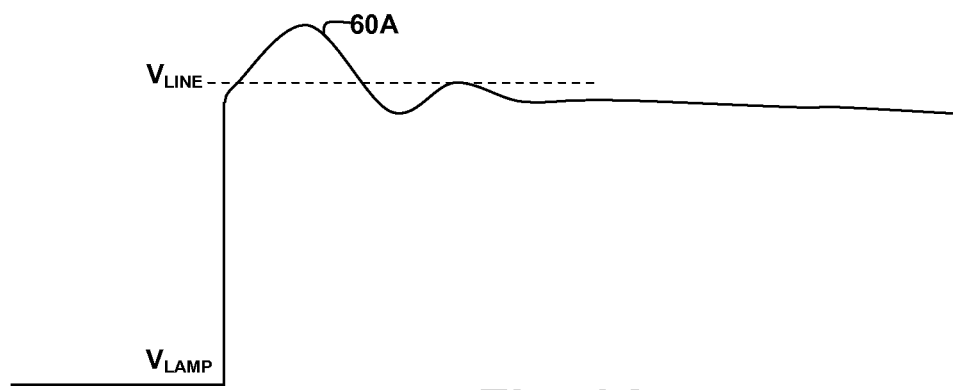
FIG. 6 is a waveform diagram depicting details of waveforms within FIGS. 5A-5E.
Figure 6B:
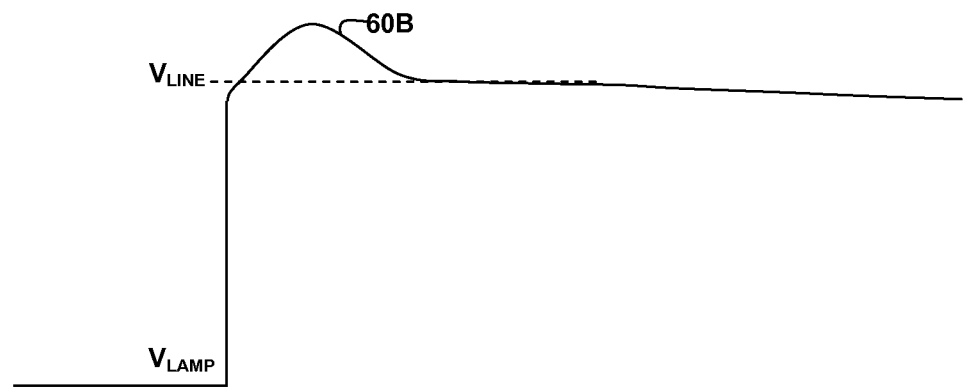
Figure 6C:
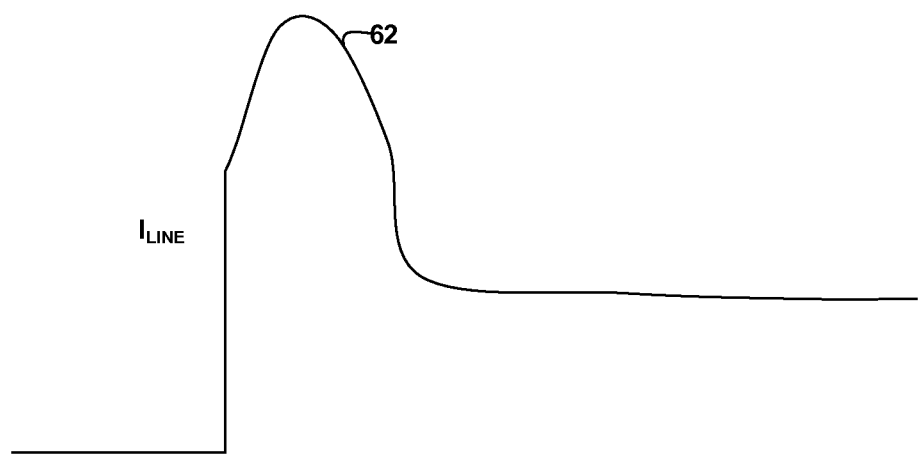

Other embodiments involve optimization of damping dissipation. To optimize attach current dissipation, as illustrated in FIGS. 6A-6C, a control system such as that shown in FIG. 7 may be used. FIG. 6B shows an optimized voltage profile 60B, and FIG. 6C shows the line current $I_{LINE}$. The control system of FIG. 7 includes an input bridge rectifier BR2, a current source (sink) I1, an EMI filter 50, an LED driver 52, a control circuit 54 and a memory 56. One technique for minimizing dissipation is to draw current from the line only when the lamp voltage (after the dimmer) is greater than the line voltage. In general, the line voltage is unknown until after the settling of the ringing.

Another embodiment involves calculating the line voltage at the time of attach from prior cycle information. That information may be simply storing the voltage at, for example, 250 us after the attach, and using that voltage to determine when to draw current on the following cycle. Another method is to synthesize an estimate of the incoming waveform, using phase-lock techniques. This method may be advantageous when dynamic changes in the phase cut are expected to be regular. The learning of the input waveform helps optimization of the attach current profile; an exemplary profile would draw extra current only when an input voltage to the lamp is greater in magnitude than the input voltage to the dimmer from the mains.

In some embodiments, more generally, voltage information from one cycle to another cycle within a given environment or system may be utilized to adjust one or more parameters of an attach current profile to yield more efficient or satisfactory operation of one or more lamps within that environment or system.

Figure 7:
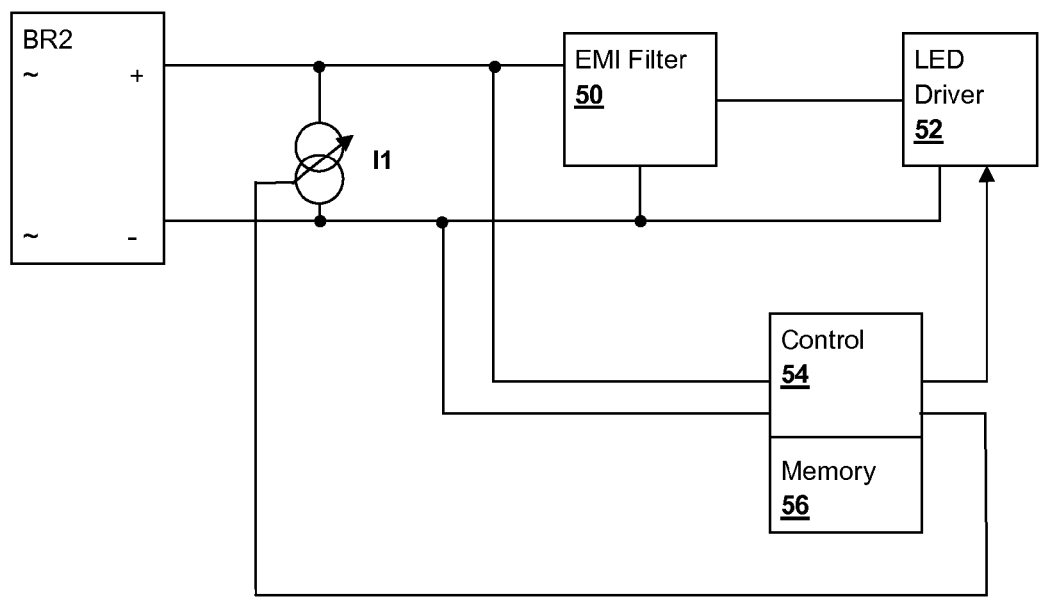
FIG. 7 is a block diagram illustrating features of another example lighting control circuit.
Figure 8:
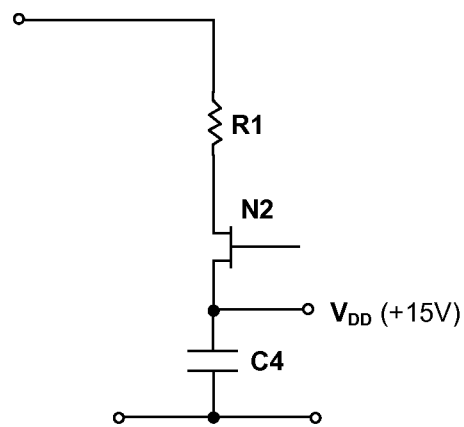
FIG. 8 is a schematic diagram illustrating details of the example lighting control circuit of FIG. 7.

FIG. 8 shows a potential circuit for implementing current source/sink I1 of FIG. 7. The depicted circuit includes a resistor R2, a transistor N2 and a capacitor C5 that filters the source voltage of transistor Q2 to produce supply voltage $V_{DD}$. In the depicted example, much of the current used is dumped into the power supply $V_{DD}$ for the control IC. By carefully timing the current drain, simplification of the auxiliary power supply may be accomplished.

The start of current drain may be set by a comparator, with the threshold set by a value calculated from the prior cycle, and the timing fixed. Alternately, a second voltage threshold may initiate the release.

Because of the delay caused by the EMI filter, the attach module can be configured before much or all of the EMI filter circuitry. This allows for a faster response time.

Figure 9:
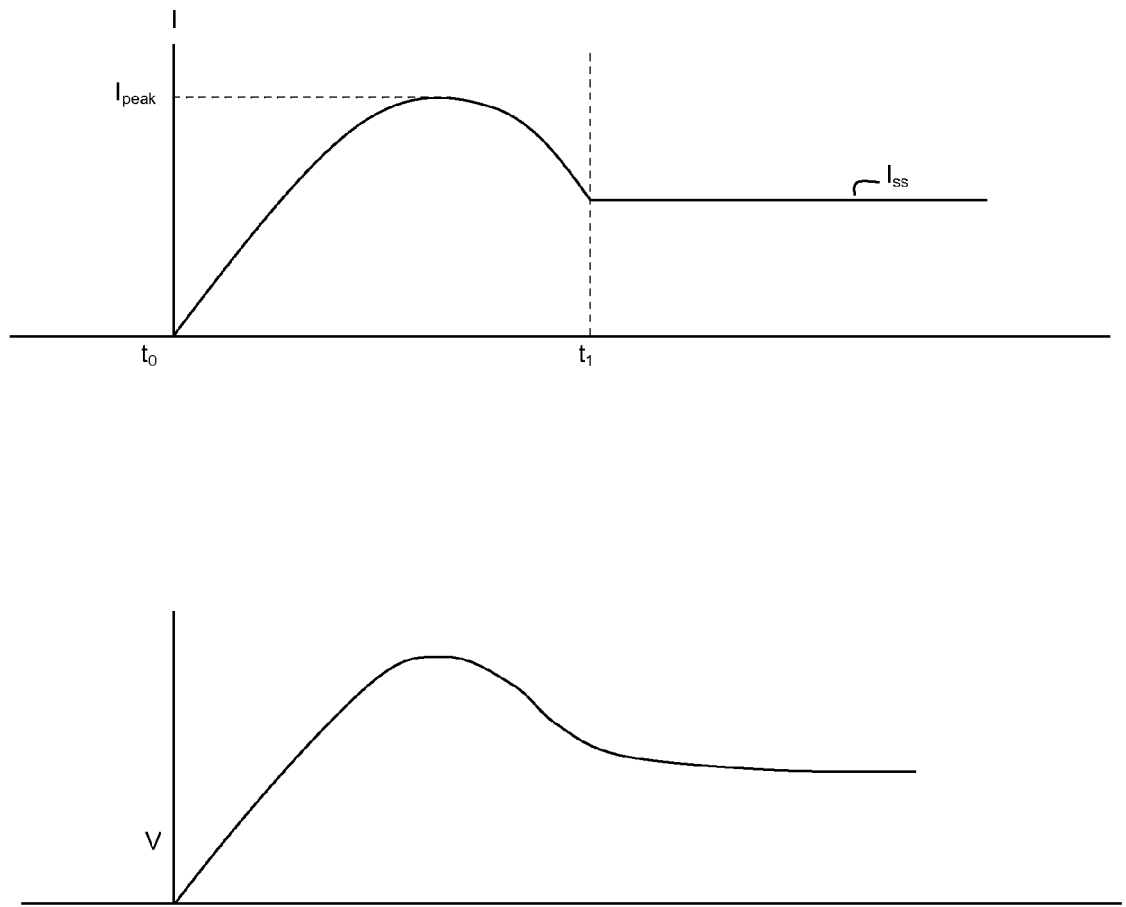
FIG. 9 is a waveform diagram depicting waveforms within the circuit of FIG. 7.

FIG. 9 illustrates example parameters associated with an attach current profile. Illustrated are a starting current (current at $t_0$), peak current $I_{peak}$, steady state hold current $I_{SS}$, and various timing information. For example, time $t_0$ is the time of the starting current, and $t_1$ is the start of the time period that the current assumes the value of steady state hold current $I_{SS}$. As illustrated, timing information may correspond to, or be relative to, a leading edge of a dimmer, shown generally in the voltage curve below the current curve. One having ordinary skill in the art will appreciate, with the benefit of this disclosure, that many parameters may make up, and be adjusted, for an attach current profile, such that performance of a lamp environment or system may be improved or optimized.

It should be understood that various operations and techniques described here may be implemented by processing circuitry or other hardware components. The order in which each operation of a given method is performed may be changed, and various elements of systems illustrated herein may be added, reordered, combined, omitted, modified, etc. It is intended that this disclosure embrace all such modifications and changes and, accordingly, the above description should be regarded in an illustrative rather than a restrictive sense.

The invention claimed is:

1. An apparatus comprising a lamp controller configured to:

monitor voltage information associated with one or more lamps or a dimmer of a system;

adjust one or more parameters of an attach current profile based on the voltage information to arrive at a selected attach current profile; and apply within the system the selected attach current profile.

2. The apparatus of claim 1, wherein the attach current profile is associated with a leading edge of the dimmer.

3. The apparatus of claim 1, wherein the one or more parameters of the attach current profile comprise one or more of: a starting current, a peak current, a steady state hold current, or timing associated with a current.

4. The apparatus of claim 3, wherein the timing is relative to a leading edge of the dimmer.

5. The apparatus of claim 4, wherein the timing is relative to the starting current, the peak current, or the steady state hold current.

6. The apparatus of claim 1, wherein the controller is configured to adjust the one or more parameters of the attach current profile iteratively.

7. The apparatus of claim 6, wherein the selected attach current profile is chosen from among two or more iteratively adjusted attach current profiles, based on a performance of the one or more lamps or dimmer of the system.

8. The apparatus of claim 1, wherein the selected attach current profile is chosen based at least in part on different behavior associated with positive and negative half line cycles associated with the system.

9. The apparatus of claim 1, wherein the controller is configured to adjust the one or more parameters of the attach current profile automatically.

10. The apparatus of claim 1, wherein the one or more lamps comprise one or more LED lamps.

11. The apparatus of claim 1, wherein the controller is further configured to determine whether parallel lamps are within the system based on the voltage information.

12. The apparatus of claim 11, wherein the selected attach current profile is different, depending on whether parallel lamps are determined to be within the system.

13. The apparatus of claim 1, wherein the controller is configured to monitor voltage information iteratively for one or more cycles of dimmer operation.

14. A method comprising:

monitoring voltage information associated with one or more lamps or a dimmer of a system;

adjusting one or more parameters of an attach current profile based on the voltage information to arrive at a selected attach current profile; and applying within the system the selected attach current profile.

15. The method of claim 14, wherein the attach current profile is associated with a leading edge of the dimmer.

16. The method of claim 14, wherein the one or more parameters of the attach current profile comprise one or more of: a starting current, a peak current, a steady state hold current, or timing associated with a current.

17. The method of claim 16, wherein the timing is relative to a leading edge of the dimmer.

18. The method of claim 17, wherein the timing is relative to the starting current, the peak current, or the steady state hold current.

19. The method of claim 14, wherein adjusting comprises adjusting the one or more parameters of the attach current profile iteratively.

20. The method of claim 19, wherein the selected attach current profile is chosen from among two or more iteratively adjusted attach current profiles, based on a performance of the one or more lamps or dimmer of the system.

21. The method of claim 14, wherein the selected attach current profile is chosen based at least in part on different behavior associated with positive and negative half line cycles associated with the system.

22. The method of claim 14, wherein the adjusting is performed automatically.

23. The method of claim 14, wherein the one or more lamps comprise one or more LED lamps.

24. The method of claim 14, further comprising determining whether parallel lamps are within the system based on the voltage information.

25. The method of claim 24, wherein the selected attach current profile is different, depending on whether parallel lamps are determined to be within the system.

26. The method of claim 14, wherein the monitoring comprises monitoring voltage information iteratively for one or more cycles of dimmer operation.

* * * * *